(12) United States Patent
 Kulathu

(10) Patent No.: US 11,162,427 B2
(45) Date of Patent: Nov. 2, 2021

(54) THERMAL BLANKET FOR GAS TURBINE ENGINE

(71) Applicant: PRATT & WHITNEY CANADA CORP., Longueuil (CA)

(72) Inventor: Ram Kulathu, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 435 days.

(21) Appl. No.: 16/055,529

(22) Filed: Aug. 6, 2018

(65) Prior Publication Data
US 2020/0040822 A1    Feb. 6, 2020

(51) Int. Cl.
*F02C 7/24* (2006.01)

(52) U.S. Cl.
CPC ............ *F02C 7/24* (2013.01); *F05D 2240/15* (2013.01); *F05D 2300/121* (2013.01); *F05D 2300/211* (2013.01); *F05D 2300/5024* (2013.01); *F05D 2300/52* (2013.01); *F05D 2300/601* (2013.01)

(58) Field of Classification Search
CPC .. F02C 7/24; F05D 2240/15; F05D 2300/121; F05D 2300/211; F05D 2300/5024; F05D 2300/52; F05D 2300/601
See application file for complete search history.

(56) References Cited

U.S. PATENT DOCUMENTS

| 5,277,959 | A | * | 1/1994 | Kourtides | ................. | B32B 3/12 428/116 |
| 9,010,687 | B2 | | 4/2015 | Holvoet et al. | | |
| 2011/0281060 | A1 | * | 11/2011 | Jorgensen | ............... | B32B 17/04 428/102 |
| 2012/0227990 | A1 | * | 9/2012 | Burnham | ............. | A62C 3/0257 169/48 |

FOREIGN PATENT DOCUMENTS

WO     WO-2005099357 A1 * 10/2005 ......... C03B 19/1453

* cited by examiner

*Primary Examiner* — Frank J Vineis
*Assistant Examiner* — Laura B Figg
(74) *Attorney, Agent, or Firm* — Norton Rose Fulbright Canada LLP

(57) ABSTRACT

The thermal blanket can be used for shielding an engine component. The thermal blanket has a window providing visual access to the engine component. The thermal blanket can have a non-transparent portion having an opening extending across the thickness of the non-transparent portion, the opening delimited by an internal edge of the non-transparent portion, and a transparent portion of transparent material in the opening, the transparent portion secured to the internal edge of the non-transparent portion.

12 Claims, 3 Drawing Sheets

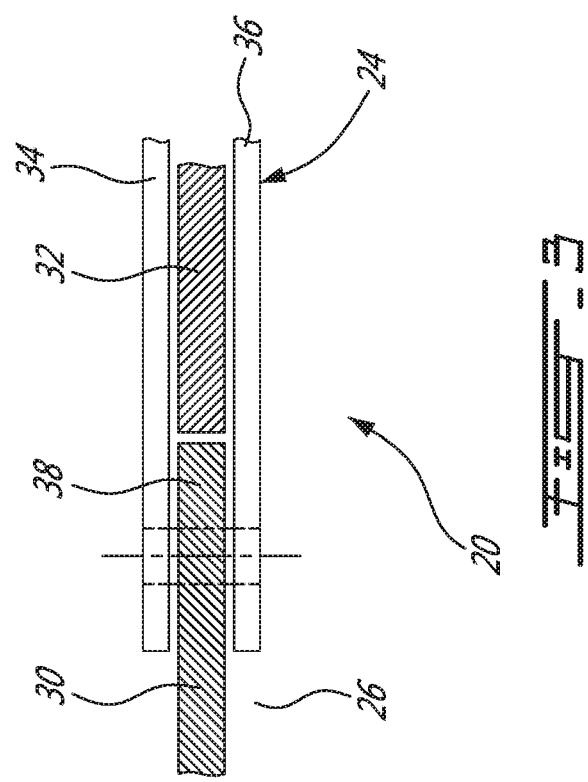
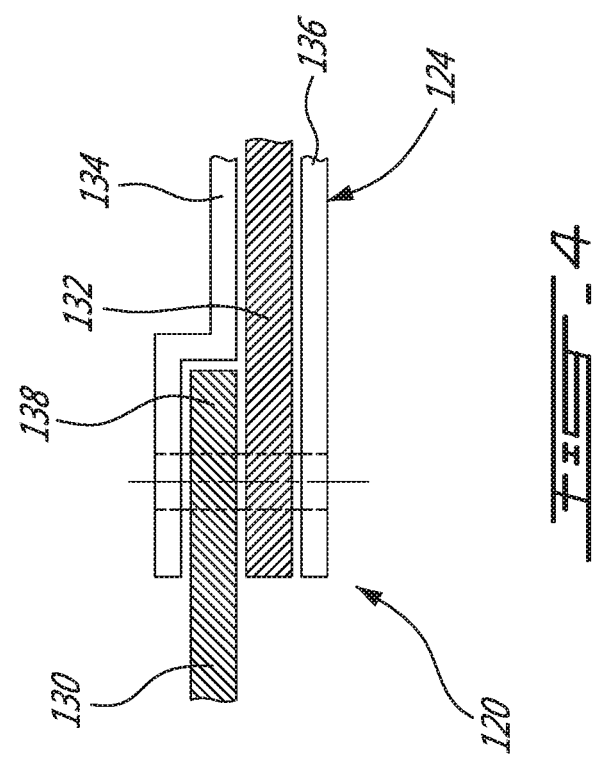

THERMAL BLANKET FOR GAS TURBINE ENGINE

TECHNICAL FIELD

The application related generally to gas turbine engines and, more particularly, to thermal blankets therefore.

BACKGROUND OF THE ART

Thermal blankets are used to protect an aircraft and/or engine components from heat caused by adjacent hotter (typically engine) components or in the event of fire. Thermal blankets can be flexible or rigid, and while their primary purpose is typically related to heat resistance or fire retardation, they must also be adapted to their environment of use, where they can be exposed to stress, oil or water, for instance. As well, to be effective, thermal blankets must cover the relevant components, and therefore must be removed if the component requires inspection or maintenance. While existing thermal blankets were satisfactory to a certain degree, there remained room for improvement.

SUMMARY

In one aspect, there is provided an aircraft engine comprising a thermal blanket extending over an engine component, the thermal blanket having a non-transparent portion having a thickness, and an opening extending across the thickness, the opening delimited by an internal edge of the non-transparent portion, and a transparent portion composed of transparent material in the opening, the transparent portion secured to the internal edge of the non-transparent portion, the transparent material of the transparent portion configured for allowing visual access to the engine component across the thermal blanket.

In another aspect, there is provided a thermal blanket for covering an engine component, the thermal blanket comprising a non-transparent portion having a thermal insulation layer sandwiched between barrier layers, and an opening extending across the thickness of the non-transparent portion, the opening delimited by an internal edge of the non-transparent portion, and a transparent portion of transparent material in the opening, the transparent portion having an external edge protruding and secured between corresponding edges of the barrier layers.

DESCRIPTION OF THE DRAWINGS

Reference is now made to the accompanying figures in which:

FIG. 3 is a cross sectional view taken along lines 3-3 of FIG. 2;

FIG. 4 is a cross sectional view showing an alternate embodiment.

DETAILED DESCRIPTION

Figure 1:
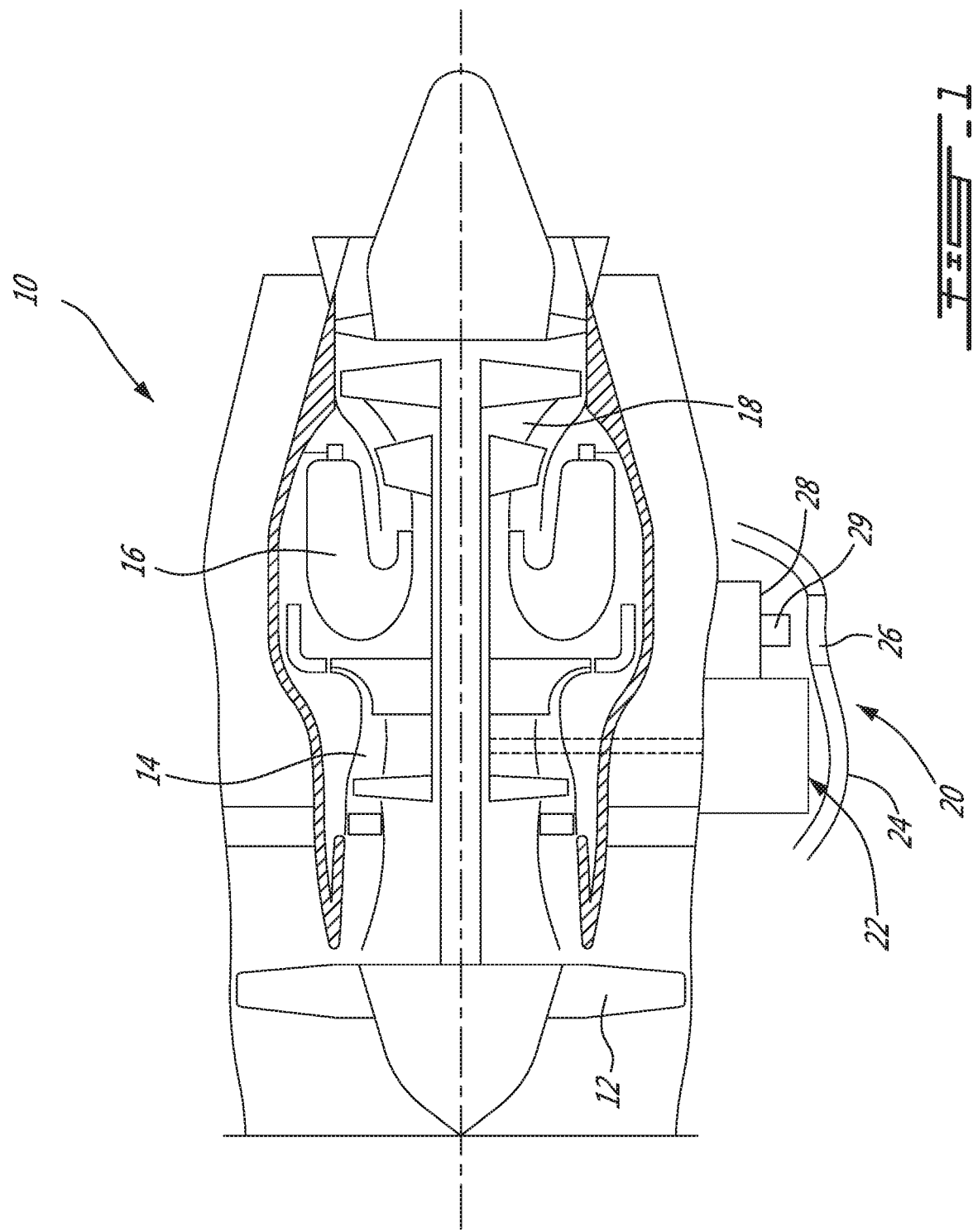
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. An engine component 22 of the gas turbine engine is shielded by a thermal blanket 20. The thermal blanket 20 includes a non-transparent portion 24, and a window 26 which allows visual access to the engine component 22. By visual access, what is meant is that the window can allow a person to see the engine component 22 across the window, independently of the purpose of such visual access, which can be for inspecting the contour of a component, reading a dial, etc.

In this specific example, the engine component is a gear box oil sump area 28, including more specifically an oil sight glass 29 thereof. This is design-specific, and it will be understood that a thermal blanket 20 having a window 26 can be useful to allow visual access to a wide variety of engine components in alternate embodiments, such as a bleed valve, an accessory data plate, or an external portion of a component having an appearance which can vary depending on its condition.

Figure 2:
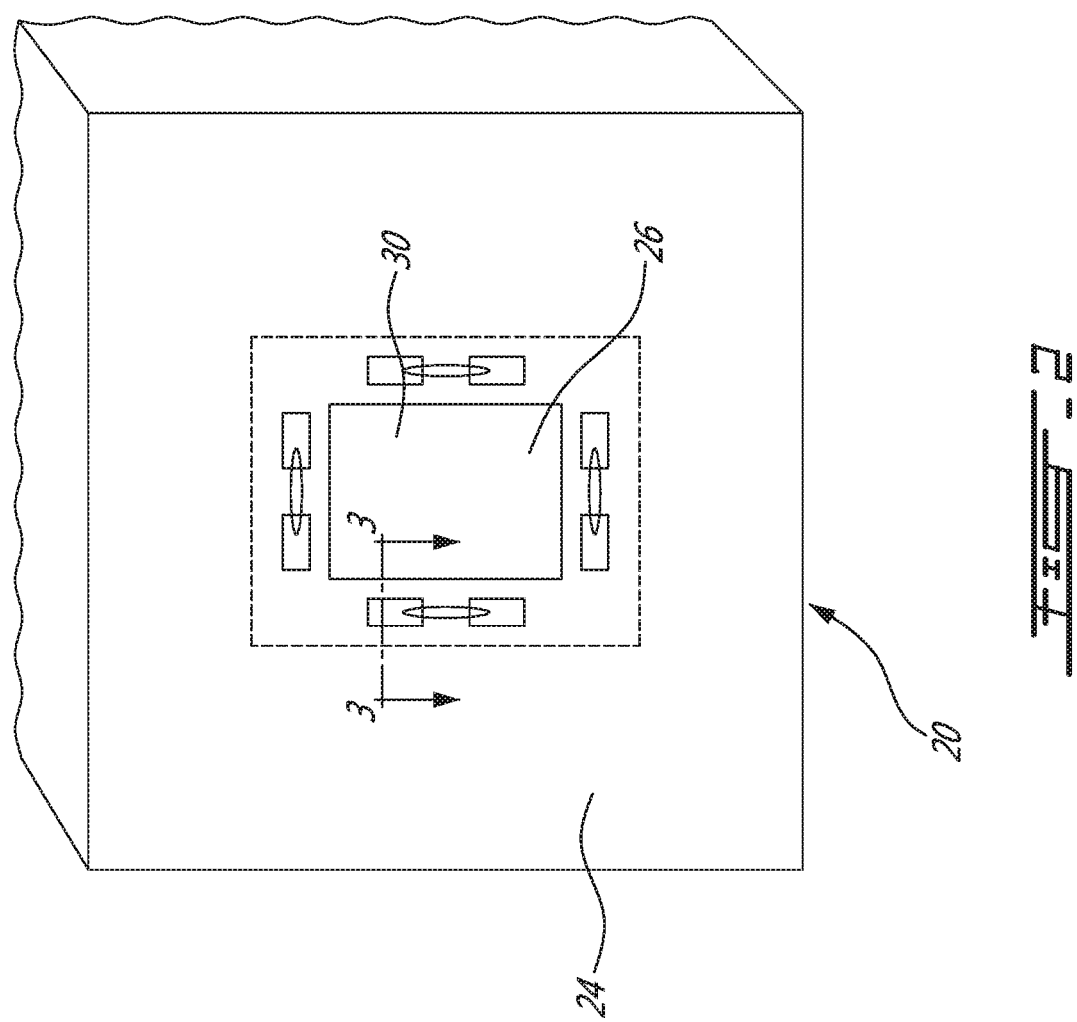
FIG. 2 is a top plan view of a thermal blanket, in accordance with an embodiment.

Referring now to FIG. 2, an example of a thermal blanket 20 having a window 26 is shown in greater detail. The non-transparent portion 24 of the thermal blanket 20 has an opening across its thickness. In some embodiments, the opening will have a closed shape, whereas in alternate embodiments, the opening can have an open shape and be positioned along an edge of the non-transparent portion 24 for instance. A pane 30 is positioned in this opening. The pane 30 can be rigid, but could also be flexible and made of a suitable transparent material such as flexible glass, for instance. The pane 30 constitutes a transparent portion in this embodiment.

Referring now to FIG. 3, it will be understood that the non-transparent portion of the thermal blanket can be made of a traditional layered thermal blanket construction including a thermal insulation layer 32 sandwiched between barrier layers 34, 36, with the opening through its thickness defining the window area 26. The barrier layers 34, 36 can serve to protect the thermal insulation layer 32 from the engine environment, or from manipulation, for instance, and can be engineered to be heat-reflective. In some embodiments, there can be more than two barrier layers, but only two are shown herein for simplicity. The internal edge of the thermal insulation layer 32 is recessed between the internal edges of the barrier layers 34. The pane 30 has an external edge 38 which protrudes between the barrier layers 34, 36 and which is secured thereto in a sandwich configuration, the external edge 38 of the pane being adjacent to the internal edge of the thermal insulation layer 32 in this example.

Turning now to FIG. 4, an alternate embodiment is illustrated. In this embodiment, the internal edge of the thermal insulation layer 132 is not recessed between the barrier layers 134, 136. Rather, the external edge 138 of the pane 130 is superposed to the internal edge of the thermal insulation layer 132, between the barrier layers 134, 136, in the sandwich configuration. More specifically, one of the opposite faces of the external edge 138 abuts against a corresponding face of barrier layer 134, whereas the other opposite face of the external edge 138 abuts against a corresponding face of the thermal insulation layer 132, and the opposite face of the thermal insulating layer 132 abuts against a corresponding face of barrier layer 136.

The configurations shown in FIG. 3 and in FIG. 4 both have in common that the pane 30, 130 is secured to the internal edge of the non-transparent portion 24, 124. The choice of a specific one of these two configurations, or of yet other configurations not illustrated, can depend on various considerations such as the type of non-transparent portion of the thermal blanket and the specificities of the context. Some thermal blanket types can have a thermal insulation layer which has rigidity, and barriers which are supple, for instance. In such cases, it can be preferred to use a configuration such as shown in FIG. 4 to harness the rigidity of the thermal insulation layer to hold the pane. Some other thermal blanket types can have barrier layers which are rigid, and an insulation layer which does not exhibit structural resistance. In such other cases, it can be preferred to use a configuration such as shown in FIG. 3, to harness the rigidity of the barrier layers to hold the pane.

Various materials can be used for various ones of the components, in alternate embodiments. Indeed, some thermal blankets can have two rigid sheets of metal forming the barrier layers for instance, in which case the thermal insulation can be provided in the form of powder or ceramic barrier filling the spacing between the sheets of metal, and some other thermal blankets can have barrier layers in the form of flexible sheets of aluminium cloth or silicon cloth (which can be aluminized for instance) sandwiching thermal insulation in the form of thermal wool, for instance. The glass pane can be made of fused silica glass for instance, which has a high heat resistance. The barrier layers can be made of a heat reflective material such as stainless steel, or of a fiberglass fabric embedded with a flame barrier material such as Nextel™ in a sandwich arrangement with insulation material such as wool, ceramic barrier such as ceramic fiber cloth, HSA paper or micro porous insulating material such as min-K™. The companies Unifrax, 3M and Morgan Ceramics are providers of insulation materials therefore.

The pane can be made of fused silica glass or quartz glass. Both fused silica glass and quartz glass offer high temperature resistance, however they perform differently in the optical spectrum. Fused silica glass offers transmission of in the visible and UV portions of the electromagnetic radiation spectrum, whereas quartz glass offers transmission in the visible spectrum. The pane can alternately be made of any suitable material offering the desired transmission of light and a high temperature resistance, and in some embodiments, it can remain satisfactory to use a glass which has a lower temperature resistance than fused silica glass.

The pane 30, 130 can be secured to the non-transparent portion 24, 124 of the thermal blanket in any suitable way. An adhesive can be used between opposite faces of edges which are in abutting contact with one another, for instance. In the embodiments shown in FIGS. 2-4, the pane is provided with a plurality of pinholes extending across its thickness, and along its edge, and a resistant thread, such as a stainless steel thread for instance, can be engaged into the pinholes and used to effectively stitch the pane to the barrier layers (FIG. 3) or stitch the pane to the barrier layers and to the insulating layer (FIG. 4).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft engine comprising: a thermal blanket extending over an engine component, the thermal blanket having a non-transparent portion having a thickness, and an opening extending across the thickness, the opening delimited by an internal edge of the non-transparent portion, and a transparent portion composed of transparent material in the opening, the transparent portion secured to the internal edge of the non-transparent portion, and the transparent portion located for allowing visual access to the engine component across the thermal blanket.

2. The aircraft engine of claim 1 wherein the transparent portion has an external edge secured to the internal edge of the non-transparent portion.

3. The aircraft engine of claim 1 wherein the non-transparent portion has a thermal insulation layer sandwiched between barrier layers, the transparent portion having an external edge protruding and secured between the internal edges of the barrier layers.

4. The aircraft engine of claim 3 wherein the thermal insulation layer has more rigidity than the barrier layers, and the external edge of the transparent portion has opposite faces abutting against one of the barrier layers and the thermal insulation layer, respectively.

5. The aircraft engine of claim 3 wherein the barrier layers have more rigidity than the thermal insulation layer, the external edge of the transparent portion has opposite faces abutting against corresponding ones of the barrier layers, the external edge adjacent an internal edge of the thermal insulation layer.

6. The aircraft engine of claim 3 further comprising a plurality of pinholes extending across the thickness of the transparent portion, along the external edge, and a metal thread stitched across the barrier layers and the pinholes, securing the transparent portion in the opening.

7. The aircraft engine of claim 3 wherein the barrier layers are made of aluminum cloth or silicon cloth.

8. The aircraft engine of claim 3 wherein the thermal insulating layer is made of a thermal wool or of a ceramic barrier.

9. The aircraft engine of claim 3 wherein the barrier layers are made of sheet metal.

10. The aircraft engine of claim 1 wherein the transparent portion is made of fused silica glass.

11. The aircraft engine of claim 1 wherein the transparent portion is made of quartz glass.

12. The aircraft engine of claim 1 wherein the transparent portion is stitched to the non-transparent portion.

* * * * *